(No Model.)
D. GILES.
PIPE TESTING MACHINE.
No. 334,524. Patented Jan. 19, 1886.
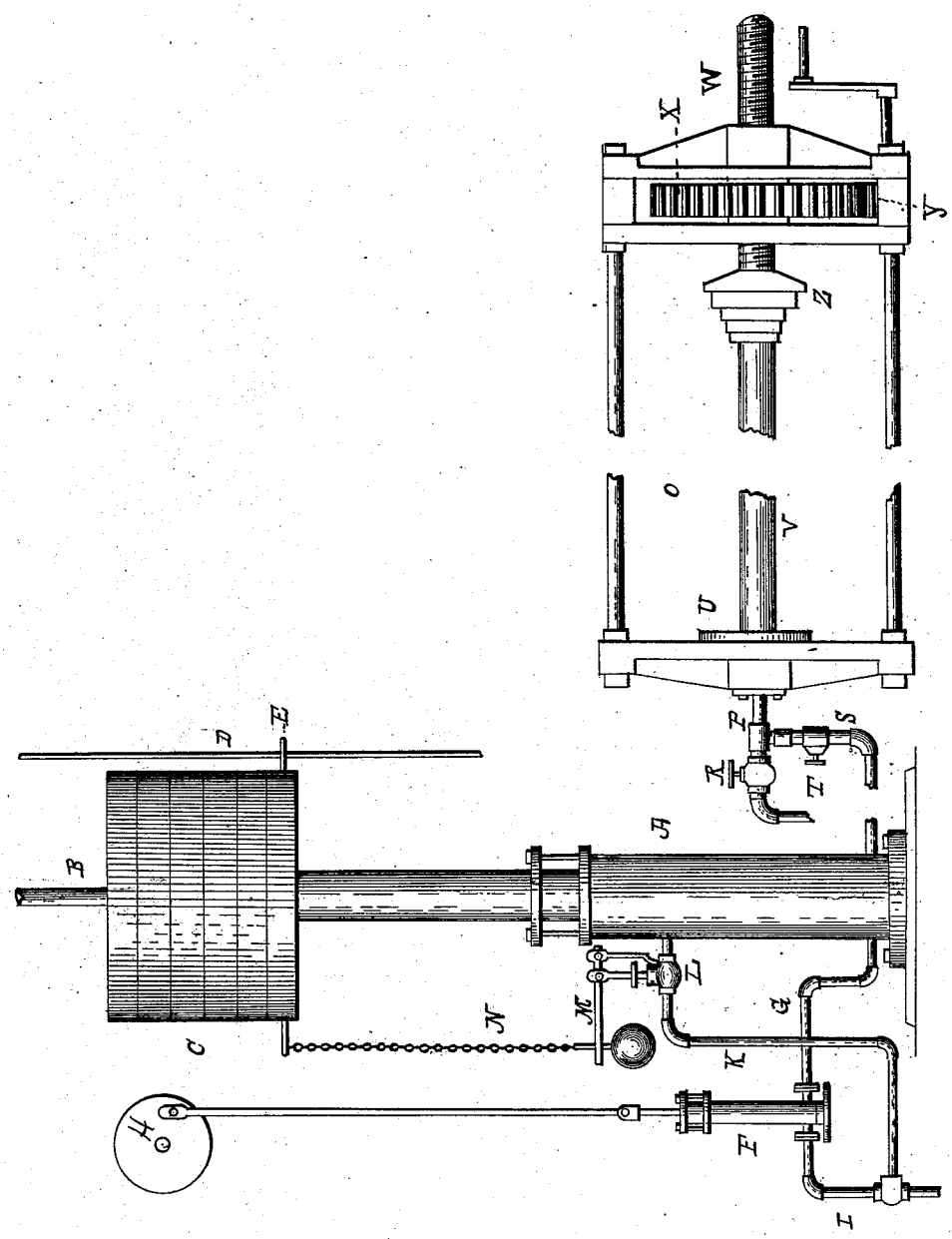
WITNESSES
Edwin I. Yewell,
John Bales
INVENTOR
David Giles
by Frank Sheehy
his Attorney

UNITED STATES PATENT OFFICE.

DAVID GILES, OF CHATTANOOGA, TENNESSEE.

PIPE-TESTING MACHINE.

SPECIFICATION forming part of Letters Patent No. 334,524, dated January 19, 1886.

Application filed September 14, 1885. Serial No. 177,074. (No model.)

*To all whom it may concern:*

Be it known that I, DAVID GILES, a citizen of the United States, residing at Chattanooga, in the county of Hamilton and State of Tennessee, have invented certain new and useful Improvements in Pipe-Testing Machines; and I do hereby declare the following to be a full, clear, and exact description of the invention, such as will enable others skilled in the art to which it appertains to make and use the same.

My invention relates to improvements in testing-machines, and is designed to produce a device for the purpose of testing the resisting strength of pipes and the like to pressure from contained fluids, that shall be simple and efficient in operation.

In describing the device reference is had to the annexed drawing representing a side elevation of the machine.

An upright cylinder, A, carries a vertical plunger and rod, B, which has on it the weights C, to a greater or less amount. A guide-rod, D, passing through eyes E on one or more of the weights, imparts a steady movement to said plunger-rod and prevents wear on the bearings of the same. From the cylinder A to a pump, F, extends a pipe, G, said pump being driven by any suitable means, as an engine, the connection to which is shown at H.

The pump receives a supply of water through a pipe, I, connected to a reservoir or water-main. Passing from the pipe I, before its connection with the pump to near the top of the cylinder, is a pipe, K, carrying near the connection with the said cylinder a weighted valve, L, the arm M of which is connected by means of a rope or chain, N, to the weights C. A pipe-holding frame, O, has one end connected by means of a pipe, P, provided with a valve, R, to a reservoir or water-main. Between the valve R and the said end of the frame a pipe, S, connects to the said pipe P, and passes to the cylinder A, which latter may be located at any distance desirable. The pipe S also carries a valve, T, near its connection with the pipe P. One end of the frame—that to which the pipe P connects—is provided with a fixed receptacle, U, for one end of the pipe to be tested, (shown at V,) and the other end of the frame carries a screw-shaft, W, having on it a large gear, X, driven by a pinion, Y, on a crank-shaft. The shaft W carries at its inner end a head, Z, for one end of the pipe V. This screw-shaft is moved longitudinally by the pinion and gear, and accommodates the frame to varying lengths of pipe, and also firmly clamps the said pipe in place, closing the ends against the escape of the water during the process of testing.

The pipe to be tested is first filled through the pipe P with water under the main-pressure. The valve R is then shut, the valve T opened, and the pump started. As the water is pumped in, the plunger, with its rod loaded with the weights C, is forced upward in the cylinder. The plunger continues to rise till the chain N lifts the weighted arm M, and thus opens the valves L, at which point the maximum height is reached. The water in the pipe and cylinder may be allowed to escape through the pipe P.

If desirable, the valve L may be located lower or higher on the cylinder than is shown.

The pressure may be increased or diminished by the addition or removal of the weights.

Several pipes may be tested at the same time.

I claim—

1. The combination, with a pipe-holder, of a cylinder having a weighted plunger-rod, a pump connected to said cylinder, a pipe leading from the pump supply-pipe to the cylinder, a weighted valve in said pipe and operated by the weighted plunger-rod, and a pipe connecting said cylinder and pipe-holder, substantially as and for the purpose specified.

2. The combination, with a pipe-holder, of a valved pipe leading to a water-supply, a cylinder connected to said pipe by a valved pipe and provided with a weighted plunger-rod, a pump connected to said cylinder, a pipe connecting said cylinder to the pump supply-pipe, and a weighted valve in said pipe, said valve being connected to and operated by said weighted plunger-rod, substantially as and for the purpose specified.

In testimony whereof I affix my signature in presence of two witnesses.

DAVID GILES.

Witnesses:
I. B. MERRIAM,
J. T. BALLARD.